United States Patent [19]

Scahill et al.

[11] 4,287,386

[45] Sep. 1, 1981

[54] END SEAL FOR CONDUITS

[76] Inventors: Steven Scahill, 131 Bolinas Rd., Fairfax, Calif. 94930; Gary M. Burrafato, 224 Humboldt Ave., San Rafael, Calif. 94901

[21] Appl. No.: 61,301

[22] Filed: Jul. 27, 1979

[51] Int. Cl.³ .......................................... H02G 15/00
[52] U.S. Cl. ................................. 174/76; 174/77 R; 174/82
[58] Field of Search .................. 174/76, 77 R, 81, 82, 174/93

[56] References Cited
U.S. PATENT DOCUMENTS

| 1,935,561 | 11/1933 | Hooley | 174/82 |
| 2,908,744 | 10/1959 | Bollmeier | 174/76 |
| 2,962,542 | 11/1960 | Witt | 174/76 |
| 3,764,728 | 10/1973 | Howie et al. | 174/76 |

FOREIGN PATENT DOCUMENTS 1204767  9/1970  United Kingdom ..................... 174/76

Primary Examiner—Roy N. Envall, Jr.
Attorney, Agent, or Firm—Edward B. Gregg; Willis E. Higgins

[57] ABSTRACT

This electrical conduit end seal includes a cylindrical walled member having an opening at one end dimensioned to receive the conduit. The end opening terminates in a first partition having at least one aperture through which a cable in the conduit may pass in a friction fit. A second partition is parallel to and spaced apart from the first partition and has at least one corresponding aperture through which the cable may pass in a friction fit. The first and second partitions form, together with the cylinder wall, a sealing chamber. The sealing chamber has first and second openings communicating from the chamber to the exterior of the end seal. In use, the end seal is fastened to the conduit with the cable extending through the partition apertures. A caulking gun or other suitable dispenser is used to inject a curable resinous material or other sealing material through one of the chamber openings. The other chamber opening allows escape of air while the material is filling the chamber. In use, it is preferred to inject a silicone resin through the first opening until resin begins to come out the second opening. The second opening is then blocked and injection continued until the resin is exuded around the apertures through which the cable passes to form a bead, then allowed to cure. The resulting hermetic seal will prevent both moisture and gases from entering the conduit, even under pressure.

6 Claims, 2 Drawing Figures

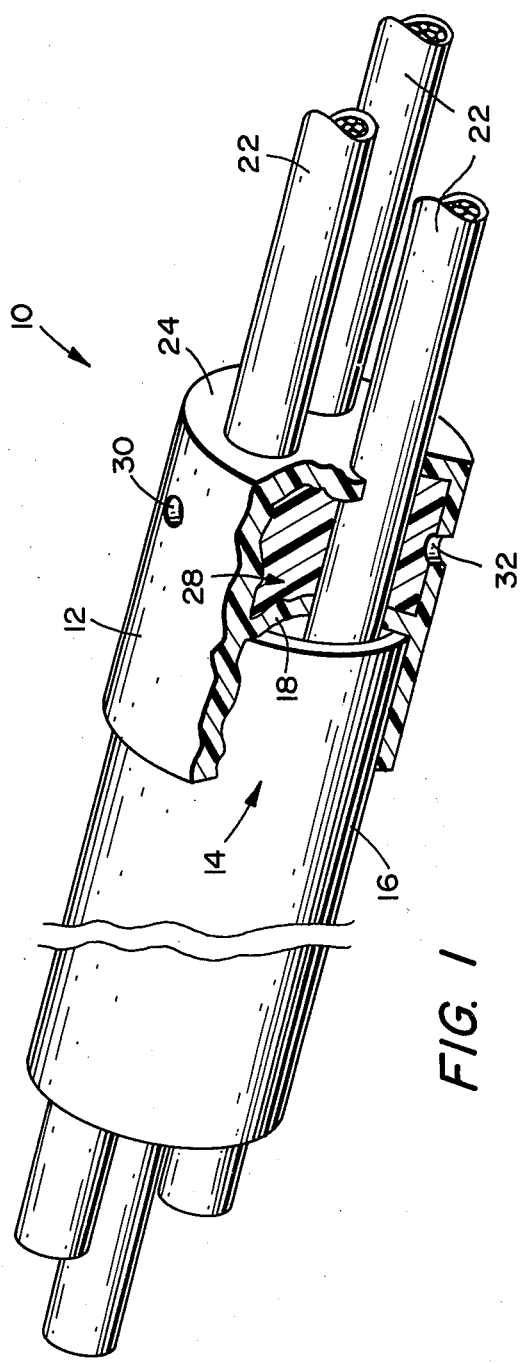
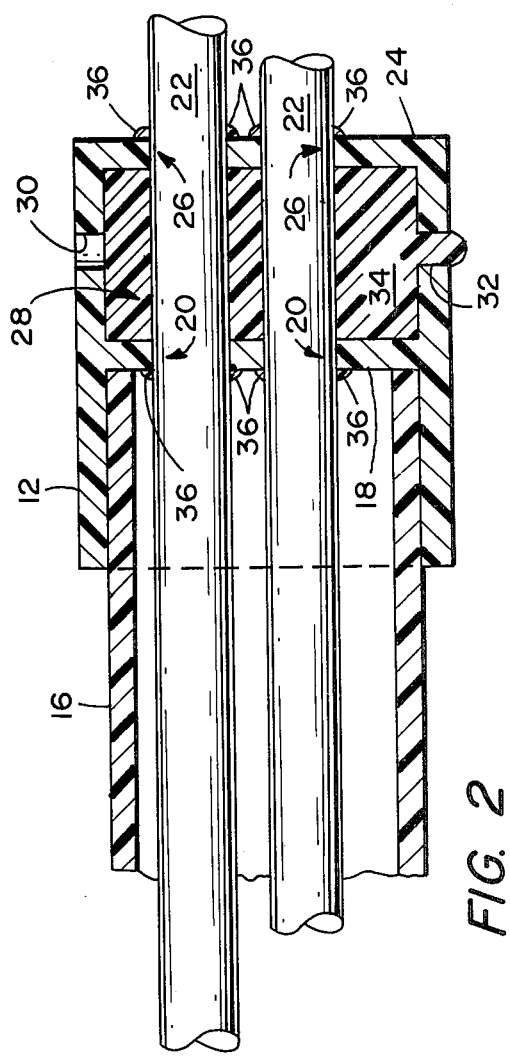

END SEAL FOR CONDUITS

BACKGROUND OF THE INVENTION

1. Field of the invention.

This invention relates to an improved end seal for an electrical conduit and method for installing the end seal. More particularly, it relates to a low cost end seal which may be provided as a standardized fitting for plastic electrical conduits which may be reliably installed under field conditions by contractor or utility personnel without specialized training.

2. Description of the Prior Art

The necessity for providing an end seal for electrical cables or conduits to prevent moisture and gases from entering the cables or conduits from their ends has long been recognized. For example, U.S. Pat. Nos. 1,109,726 and 1,115,447 disclose end seals particularly adapted for a lead sheath cable employed at that time. A further refinement in an end seal for such lead sheath cable is found in U.S. Pat. No. 2,247,671.

Somewhat similar considerations apply when it is desired to splice cable together. Various housing structures are disclosed for this purpose, as disclosed in, for example, U.S. Pat. No. 3,569,608 and U.S. Pat. No. 3,823,254. In particular, U.S. Pat. No. 3,569,608 discloses the concept of compressing an elastomeric member in a cable splicing housing in order to form a reliable seal. U.S. Pat. No. 3,655,907 discloses the application of that approach to a conduit cable end seal. Various end seals are commercially available which employ the compression of a rubber or similar member to produce the seal. However, such end seals consist of at least several separate parts which must be carefully installed, and they are sufficiently expensive so that they are usually only employed for specialized applications.

At the present time, the use of polyvinyl chloride (PVC) plastic pipe for electrical conduits, particularly in residential hook-ups, has achieved wide usage. As underground electrical distribution lines become more popular the usage of these conduits should become even more widespread. Although the compressed resilient member type of end seal can be employed with PVC conduit, the high cost and difficulty of installing such seal has meant that PVC conduits are usually installed with no end seals. A need therefore remains for a conduit end seal especially adapted for use with PVC and other plastic pipe conduit.

SUMMARY OF THE INVENTION

Accordingly, it is an object of this invention to provide a conduit end seal especially adapted for use with plastic electrical conduit.

It is another object of this invention to provide a low cost end seal for an electrical conduit which may be installed in a foolproof manner under typical field conditions.

It is a further object of this invention to provide a simple and reliable method for installing an electrical conduit end seal which will consistently produce a fluid tight seal under field conditions.

It is still another object of this invention to provide a low cost end seal for an electrical conduit that may be employed in a variety of uses.

The attainment of the foregoing and related objects may be achieved through use of the novel electrical conduit end seal herein disclosed. This end seal includes a cylindrical walled member having an opening at one end dimensioned to receive the conduit. The opening may be interiorly threaded to mate with corresponding threads on the conduit, or the conduit may be cemented to the end opening in accordance with conventional practice for fitting PVC pipe. The end opening terminates in a first partition having at least one aperture through which the cable may pass in a friction fit. A second partition is parallel to and spaced from the first partition. It has at least one corresponding aperture through which the cable may also pass in a friction fit. The first and second partitions form, together with the cylinder wall, a sealing material chamber. The chamber has first and second openings communicating from it to the exterior of the end seal, desirably through the cylinder wall. The end seal may be formed from polyvinyl chloride or other suitable plastic material in one piece through a casting or molding process. Alternatively, the parallel partitions may be fabricated as separate inserts to allow variation in the number and placement of their cable receiving apertures while employing the same standardized cylindrical walled members.

In use the cable is passed through the apertures in the first and second partitions. The end seal is then mounted on the end of the conduit employing conventional plastic pipe fitting techniques. Using a caulking gun or other dispenser, a sealing material, such as a curable resinous material, preferably a silicone resin, is used to fill the chamber defined by the partitions and cylinder wall through the first opening. The second opening allows air to flow out of the chamber as it fills. When the sealing material begins to flow out the second opening, it is preferably temporarily blocked, such as with a finger. The injection of sealing material continues until the sealing material is exuded around the apertures through which the cable passes. If a curable resinous material is used as the sealing material, it is then allowed to cure. Cure of such a resinous material causes it to expand, thus providing a more effective seal.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of an end seal in accordance with the invention, as installed, with a cut-away to show detail.

FIG. 2 is a cross section view of the end seal shown in FIG. 1, taken along the line 2—2.

DETAILED DESCRIPTION OF THE INVENTION

Turning now to the drawings, more particularly to FIGS. 1 and 2, there is shown an end seal 10 in accordance with the invention. The end seal 10 is formed from a cylindrical walled member 12 having an opening 14 at one end. The opening 14 is dimensioned to receive a conventional PVC electrical conduit 16. The opening 14 terminates in a first partition 18. The partition 18 has apertures 20 through which cables 22 from inside the conduit 16 may extend in a friction fit. A second partition 24 is spaced apart from and parallel to the first partition 18. The second partition 24 has corresponding openings 26 to the openings 20 in the first partition, through which the cables 22 also may pass in a friction fit.

The two partitions 18 and 24 and the cylinder wall 12 form a sealing material chamber 28. First and second openings 30 and 32 through cylinder wall 12 connect the chamber 28 externally of the end seal.

When installed as shown, the chamber 28 of the end seal is filled with a cured resinous material 34, which also extends out the openings 30 and 32 and around the cables 22 as shown at 36, due to expansion during curing. When the cured resinous material 34 is utilized in accordance with the novel process described below to produce the structure shown, the result is a highly effective seal which will withstand substantial external pressure applied to it without permitting leakage into the conduit 16.

The following perferred process is employed for installing the conduit end seal 10 of this invention. The cables 22 are passed through apertures 20 in partitions 18 and 24 defining the chamber 28. The conduit 16 is then fastened to end 14 of the end seal 10. This is done through use of a conventional adhesive for PVC pipe or by threading the interior of cylinder wall 12 at end 14 and the exterior of conduit 16. A curable resinous material is injected through use of a caulking gun or other suitable dispenser through opening 30 in wall 12 of the end seal. A curable silicone resin, i.e., an organopolysiloxane, is preferably employed as the curable resinous material, due to its thermal stability and desirable dielctric properties for electrical applications. A suitable curable silicone resin is available under the trademark Silicone Seal. Alternatively, a highly viscous grease could be employed as well and may be preferable in some applications where it is desired to remove the end seal periodically for maintenance or other work on the electrical system employing it. If desired, a fitting may be provided in the opening 30 for injecting the resin, although the tip of a conventional caulking cartridge works just as well. During the injection of the curable resinous material, air in the chamber 28 is allowed to escape through opening 32 in the chamber until resinous material starts to flow through the opening 32. The opening 32 is then blocked, such as with a finger, and injection of the curable resinous material continues until resinous material is exuded around the apertures 20 through which the cables 22 pass, to form beads 36. The curable resinous material is then allowed to cure.

Curing of such resinous materials causes an expansion in their volume. This expansion typically causes the beads 36 to increase in size as more material is exuded around the cables 22 as curing takes place. This expansion within the chamber 28 and through aperatures 20 and 26 results in a more effective seal in use of the end seal 10.

In a specific example, a commercially available PVC conduit carrying three cables as shown in the drawings was attached to an end seal in accordance with the invention, also fabricated from PVC, utilizing a PVC adhesive. The process as described above was carried out, employing the commercially available Silicone Seal silicone resin. A fitting was installed on the other end of the PVC conduit to allow the conduit to be pressurized. The end seal with its cured silicone resin was able to withstand 7 p.s.i.g. indefinitely, thus meeting the requirements of a large utility for conduit end seals. In order to test the pressure level necessary for the end seal to fail, the pressure was gradually increased until a slow leak through the end seal was observed around the beads 36 by application of a soap solution when the pressure was slightly in excess of 20 p.s.i.g.

On the basis of this test, it was concluded that the end seal is suitable for use in common utility corridors with gas and water lines to prevent leakage of gas or water into the electrical conduit, even under pressure.

In addition to its use as a seal at the end of an electrical conduit, the end seal of this invention may also be employed to seal cable splices by placing a length of conduit over the splice and attaching an end seal at each end of the conduit. This can be done either in the case of a splice in a cable carried by conduit or, in the case of a spliced bare cable, around the splice.

Should it become necessary to remove an end seal in accordance with this invention for maintenance or other work on an electrical system including the seal, the seal may be simply removed and discarded due to its low cost. A new end seal may then be installed after completion of the work. Alternatively, if a viscous grease is employed as the sealing material, the end seal may be re-used.

It should now be apparent that an end seal and novel process for its installation suitable for achieving the stated objects of the invention has been provided. The end seal is a simple, one piece element that may be provided as a standardized fitting for PVC conduit. It may be installed through a simple and reliable process which will consistently produce a fluid tight seal under typical field conditions of use. This end seal may be used in a variety of electrical installation conditions and is of sufficiently low cost that it may be discarded and replaced when it is necessary to break the seal. The seal may be installed in a horizontal position as shown in the drawing, vertically, or in any other orientation.

While the invention has been shown and described in a preferred embodiment, it should further be apparent to those skilled in the art that various changes in form and details of the invention may be made. It is intended that such changes be included within the spirit and scope of the claims appended hereto.

I claim:

1. A device for use in forming an end seal for an electrical conduit carrying at least one cable comprising, in integral construction, a cylindrical walled member having an opening at one end dimensioned to receive the conduit and terminating in a first partition having at least one aperture through which the cable may pass in a friction fit, a second partition parallel to and spaced from said first partition and having at least one corresponding aperture through which the cable may pass in a friction fit, said first and second partition forming, together with the cylinder wall, a chamber, said chamber further having at least a first opening communicating from the chamber to the exterior of the end seal.

2. An end seal including the device of claim 1 in which said chamber has a second opening, said end seal additionally comprising a sealing material filling said chamber, extending into the first and second openings, and extending through the cable apertures around a cable passing through the apertures.

3. The end seal of claim 2 in which said sealing material is a cured resinous material.

4. The end seal of claim 3 in which said cured resinous material is a silicone resin.

5. The device of claim 1 in which the electrical conduit is plastic pipe and said device is also formed from a plastic material.

6. The device of claim 5 in which the plastic pipe and said device are both formed from polyvinyl chloride.

* * * * *